Jan. 12, 1954
O. NÜBLING
2,665,612
DEVICE FOR PRODUCING INTERNALLY TOOTHED
RING GEARS AND THE LIKE
Filed April 26, 1951
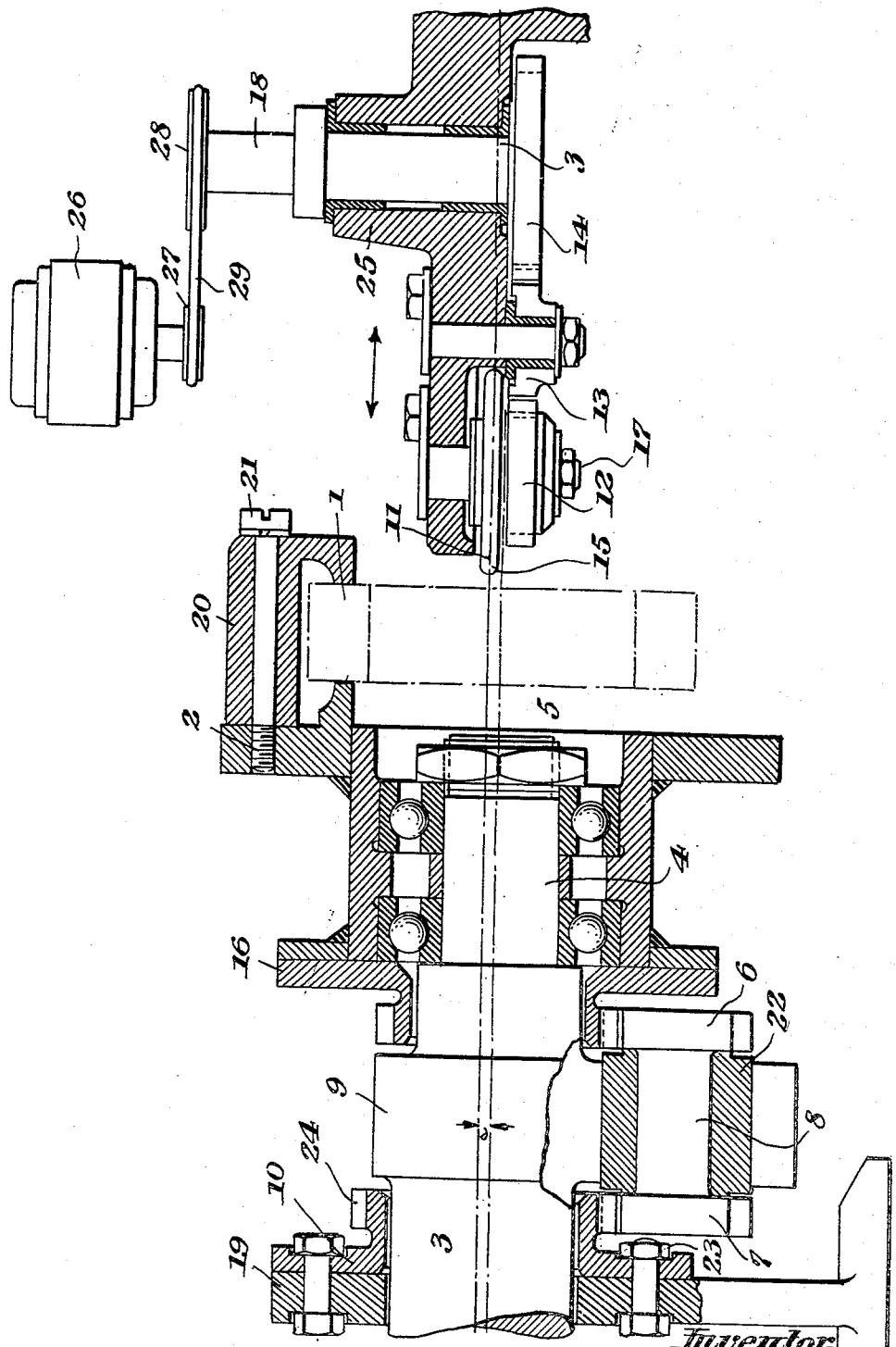
Inventor:
Otto Nübling
By Wenderoth, Lind & Ponack, attys.

Patented Jan. 12, 1954

2,665,612

UNITED STATES PATENT OFFICE 2,665,612

DEVICE FOR PRODUCING INTERNALLY TOOTHED RING GEARS AND THE LIKE

Otto Nübling, Berlin-Frohnau, Germany, assignor to Theodor Klatte, Bremen-Huchting, Germany Application April 26, 1951, Serial No. 223,059

4 Claims. (Cl. 90—3)

At the present time there are gear pumps in use in which an externally toothed gear wheel coacts with an internally toothed ring gear which has one more tooth than the externally toothed gear. The externally toothed gear wheel is supported in bearings eccentrically to the ring gear a predetermined amount and is actuated from a ring gear in a joint revolution therewith. The gear wheel has a speed of rotation which is as much greater than that of the ring gear corresponding to the differential tooth divisions. For insuring that the spaces between the teeth on the gear wheel and the ring gear are sufficiently tight, precise and exact cutting or manufacturing of the teeth on the gear wheel is necessary.

An object of the present invention is to provide a device for cutting teeth on the ring gear for devices of this kind and which will work with exactness and be inexpensive to construct and operate.

Other objects will be apparent from the following detailed discussion of a single preferred embodiment of the present invention taken in conjunction with the appended drawing in which the single figure is a longitudinal view of the device partly in section.

In the operation of the present device for cutting the teeth, it is essential that the ring gear, in the rough state, will revolve but the cutting tool on the contrary will be displaceable only in the longitudinal direction. The cutting profile of the cutting tool must correspond to the profile of the tooth of the gear wheel.

It is also desirable and necessary that the ring in the rough state execute, in relation to the cutting tool, the same absolute movement in which the two gears will move in relation to one another in the operating state.

In the drawing, the piece which will be formed into the ring gear is shown in the rough state at 1. The piece in the rough state 1 is fastened in position on the chuck 2 by means of gripping devices. Only one of these gripping devices is shown at 20 attached to the chuck by means of screw 21, but it is understood that as many gripping devices as desired can be utilized. The chuck 2 is rotably supported on the shaft 4 which is mounted in crank fashion eccentrically to the axis of the machine shaft shown at 3 in broken lines. The amount of eccentricity between the axis of the shaft 4 shown in broken lines at 5 with respect to the axis of the machine shaft, corresponds to the extent by which the ring gear operates eccentrically to the gear wheel in the completed pump. The chuck 2 together with the piece in the rough state 1 due to the mounting thereof swings in a circle having the radius e around the axis 3 of the machine shaft. The chuck 2 and work piece 1 in addition are imparted a superimposed rotation around the shaft 4 by means of a drive consisting of a planetary gear having a gear wheel 16 and a pair of planetary wheels 6 and 7. The planetary wheels 6 and 7 are connected on shaft 8 and journalled in bearing 22. The shaft 8 and bearing 22 are supported at the periphery of the machine shaft 9 and adapted for rotation therewith.

The planetary wheels 6 and 7 are driven by means of a stationary sun wheel 10 which is concentric with the shaft of the machine and bolted to the frame 19 of the machine as shown at 23 or by other suitable means. The planetary wheel 7 coacts with the gear rim 24 of sun wheel 10 for rotation thereof. The cutting tool 11 is shown as consisting of a cutter rotatable around the axis 17 but which can consist in a grinding wheel or other suitable means. The tool 11 is mounted on a tool carrier 25 which is displaceable as shown by the arrow in the figure so that it can be moved toward or against the rough work piece in an axial direction. The tool 11 is driven by the shaft 18 and gears 14, 13, and 12 as can be seen in the figure. The shaft in turn is driven by any suitable means, such as an electric motor 26, pulleys 27, 28 and a belt or chain 29.

The depth of cutting is adjusted by transverse displacement of the tool. The profile of the cutting part 15 of the tool 11 corresponds to the profile of a tooth of the gear wheel with which the gear ring that is to be cut is to coact in the completed pump.

It is obvious that modifications may be made in details of the device without departing from the scope of the invention as defined in the appended claims.

I claim:

1. A device for the cutting of internal teeth in gear rings of gear pumps adapted for coaction with a gear wheel supported eccentrically thereto comprising a first shaft rotatably mounted, a second shaft eccentrically mounted on an end of said first shaft, a work piece holding chuck rotatably journalled on said eccentric shaft, said eccentric shaft being displaced in crank fashion on said first shaft to the extent of the eccentricity between the gear ring and gear wheel of the gear pump, a bearing fixed on the periphery of said first shaft of said device in eccentric relation thereto, planetary gears comprising axially spaced planetary wheels on a common shaft rotatably journalled in said bearing and rotatable with said shaft of said device, a sun wheel fixed to the frame of said device and concentric with said first shaft of said device, said sun wheel being in operative connection with one said planetary wheel for rotation thereof and the other said axially spaced planetary wheel upon rotation of said shaft of said device, said planetary gears coacting with said chuck for superimposing a speed of rotation upon the machine rotation by rotating said chuck around said eccentric shaft.

2. In a device as claimed in claim 1, a gear wheel secured to said chuck concentric with said eccentric shaft, said other said axially spaced planetary wheel coacting with said gear wheel secured to said chuck for the superimposing of speed of rotation upon the machine rotation by rotating said chuck around said eccentric shaft.

3. A device as claimed in claim 1, and including a tool carrier, said tool carrier being displaceable longitudinally with respect to a work piece clamped in said chuck and adapted for holding a cutting tool.

4. A device as claimed in claim 3, said cutting tool having a cutting profile corresponding to the profile of the teeth of the gear wheel with which the gear ring to be cut is to coact in a completed pump.

OTTO NÜBLING.

References Cited in the file of this patent

UNITED STATES PATENTS

| Number | Name | Date |
|--------|------|------|
| 1,633,051 | Trbojerich | June 21, 1927 |